US007024405B2

(12) United States Patent
Salerno et al.

(10) Patent No.: US 7,024,405 B2
(45) Date of Patent: Apr. 4, 2006

(54) METHOD AND APPARATUS FOR IMPROVED INTERNET SEARCHING

(75) Inventors: John J. Salerno, Deerfield, NY (US); David R. Couzelis, Whitesboro, NY (US); Douglas M. Boulware, St. Louis, MO (US); Carmen M. Malagisi, Rome, NY (US); John E. Myers, Oneida, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 361 days.

(21) Appl. No.: 10/198,245

(22) Filed: Jul. 18, 2002

(65) Prior Publication Data

US 2004/0015485 A1    Jan. 22, 2004

(51) Int. Cl.
*G06F 17/30* (2006.01)
(52) U.S. Cl. ................. 707/3; 707/4; 707/10
(58) Field of Classification Search .............. 707/3, 707/4, 10
See application file for complete search history.

(56) References Cited

U.S. PATENT DOCUMENTS

| | | | | |
|---|---|---|---|---|
| 5,454,106 A | * | 9/1995 | Burns et al. .................. 707/4 |
| 5,634,053 A | * | 5/1997 | Noble et al. .................. 707/4 |
| 6,226,632 B1 | * | 5/2001 | Takahashi et al. ............. 707/3 |
| 6,240,409 B1 | * | 5/2001 | Aiken ........................... 707/4 |
| 6,513,032 B1 | * | 1/2003 | Sutter ........................... 707/3 |
| 6,556,989 B1 | * | 4/2003 | Naimark et al. ............... 707/5 |
| 6,584,468 B1 | * | 6/2003 | Gabriel et al. ................ 707/10 |
| 6,728,696 B1 | * | 4/2004 | Walton ......................... 707/2 |
| 6,757,706 B1 | * | 6/2004 | Dong et al. ................ 709/203 |
| 6,766,361 B1 | * | 7/2004 | Venigalla .................... 709/217 |
| 6,829,599 B1 | * | 12/2004 | Chidlovskii .................... 707/3 |
| 2003/0050927 A1 | * | 3/2003 | Hussam ........................ 707/5 |

OTHER PUBLICATIONS

Kobayashi et al. Information retrieval on the web, ACM Computing Surveys, 200, 144-173.*

* cited by examiner

*Primary Examiner*—Jean M. Corrielus
*Assistant Examiner*—Baoquoc N. To
(74) *Attorney, Agent, or Firm*—Joseph A. Mancini

(57) ABSTRACT

Method and apparatus for improved Internet searching. A user defines their search objective using topic trees. The user is provided a set of tools that allow for the creation and modification of these topic trees and storage for later use. From the topic tree, a user can select a single item, a collection of items or the entire topic tree to collect upon. Results from the selected search engines are returned, stored and displayed.

18 Claims, 6 Drawing Sheets

$$\text{Rank} = \begin{bmatrix} \text{Number of} \\ \text{Search Engines} \\ \text{that Returned a} \\ \text{Document} \end{bmatrix} * \begin{bmatrix} \text{Separation} \\ \text{Coefficient} \end{bmatrix} - \begin{bmatrix} \text{Average Rank} \\ \text{from Each} \\ \text{Search Engine} \\ \text{Return} \end{bmatrix}$$

FIGURE 5

METHOD AND APPARATUS FOR IMPROVED INTERNET SEARCHING

STATEMENT OF GOVERNMENT INTEREST

The invention described herein may be manufactured and used by or for the Government of the United States for governmental purposes without the payment of any royalty thereon.

BACKGROUND OF THE INVENTION

When using one of many popular search engines on the Internet to search for a particular topic a user is interested in, most of the results returned are unrelated, or don't have the information the user is searching for. Typically the user ultimately looks through many Web pages before the information is found—if in fact he finds what he is looking for! Different search engines search different parts of the Internet (alternately, the "Web" or "www") and thus give the user different results. The question often becomes: which search engine to use?

A typical scenario follows. A user wishes to perform research in a specific area or perhaps desires to write an article or report. First, many users would come up with an outline of the report or article on which they are researching. Second, and prior to the pervasiveness of the www, he would be to go to the library and find other articles or reports similar to what he is looking for. This is usually done nowadays through on-line card catalogues.

In contrast to today, a user logs on, brings up a web browser, and connects to a search tool. However, literally hours can be expended entering different keywords in various permutations in an attempt to find relevant documents. The user may actually find very little information for his effort. The user then runs a second search tool and repeats the entire process. After hours of searching and typing the user may have found a few documents.

Many people believe the Internet is a vast library of interconnected resources and the only difference between individual search tools are the techniques they use to find relevant documents. What few realize is that each search tool is searching against their own database of collected indices. These databases are built by the search tool vendors starting with a collection of URLs and following each URL on each page until all have been exhausted. This is typically accomplished through the use of spiders or crawlers. Since these tools are starting at different places, the databases themselves contain different information.

For this reason, meta-search engines are increasing in popularity. These engines access multiple individual search tools and thus multiple databases. The advantage is that by using multiple databases the search is covering more of the Internet and hopefully produces better results. A second advantage of using multiple search engines is collaboration among the results they each produce. For example, if two or more sources return the same document one can say that document is likely more relevant than a single source returning the same or another document.

The problem with each of the methods of searching the Internet is that there is no perfect engine when it comes to finding the information that a user may need. Additionally, there is no absolute basis for a comparison of the engines as each has its own unique features and databases. A site on the Internet that is clearly the best may not be able to be found by querying only one individual search engine, leaving the user to have to go to several search engines to perform a search accurately. In principal, a meta-search engine is a good alternative to individual search engines, but each of the hundreds of meta-search engines uses a different algorithm or method of sorting the results. None of these algorithms stand out as being superior to the others. Meta-search engines are also as commercial as the individual search engines, selling a high return on its list of sites to the highest paying customer. This causes the user to have a poor representation of what is available on the Internet for the topic that they search for.

Meta-search engines are not without their own problems. These engines query individual search engines and parse the source's results page. The parser that a meta-search engine uses must be knowledgeable about the source's results page format. If the format changes, the meta-engine's parser can fail. It has been found that web page results change on some sources every one to two months. For the most part, maintenance on these parsers is done by the developer and generally requires software code changes. For those meta-search engines that are accessed through a web browser, the maintenance is done centrally. Those that are client-based require a software patch to be downloaded. Besides maintenance, meta-search engines are not user configurable. Users cannot modify or fix the broken parser nor can they add their own.

Today's meta-search engines utilize a concept called Web Scraping. Web Scraping involves the process of querying a source, retrieving the results page and parsing the page to obtain the results. At that point, the meta-search engine will then normalize the information, and in many cases, combine them with other results and present a single ranked list. The problem with this approach is that individual sources change the format of their pages often. Web scrapers break when this happens; therefore maintenance is critical. One approach taken by a majority number of meta-search engines is to provide centralized service. That is, the meta-search engine is hosted on a centralized server and access is through a web browser. A few have opted to provide a client application. In both cases, the user is at the mercy of the developer. If a web scraper breaks, the user must wait for the developer to fix it. Centralized approaches are easier to fix and require no software changes on the part of the user. On the other hand, client applications would require a patch to be downloaded. In both cases, the user has no control and cannot add additional sources at will.

It would be desirable to have a new generation of meta-search engines that allow for easy maintenance, user configuration and the ability to perform multiple queries.

OBJECTS AND SUMMARY OF THE INVENTION

One object of the present invention is to provide a method and apparatus for more efficient Internet searching than is presently available in the prior art by reducing the number of search results that are unrelated to the search objectives of the user.

Another object of the present invention is to provide a method and apparatus for optimizing the manner in which multiple search engines are utilized in Internet searching.

Yet another object of the present invention is to provide a method and apparatus that allows for the creation of a hierarchy or search terms.

Still another object of the present invention is to provide a method and apparatus that ranks search results.

The present invention provides a method and apparatus for improved Internet searching. A user defines their search objective using topic trees. The user is provided a set of tools that allow for the creation and modification of these topic trees and storage for later use. From the topic tree, a user can select a single item, a collection of items or the entire topic tree to collect upon. Results from the selected search engines are returned, stored and displayed.

According to an embodiment of the present invention, method for improved internet searching, comprises the steps of: opening a topic tree or creating a new one if none exists; a first step of selecting either a topic or a folder of topics from which to search, from the topic tree; a second step of selecting a search topic; executing a search; presenting a summary page; retrieving individual documents; and printing the documents.

According to a feature of the present invention, method for improved internet searching, further comprises the steps of; prior to the step of opening a topic tree, determining whether the internet is available; if the internet is available, then, proceeding to the step of opening a topic tree; otherwise, determining if the offline mode has been chosen; if the offline mode has been chosen, then, displaying an indication that online mode is disabled; and; proceeding to said step of opening a topic tree, otherwise, exiting the program.

According to yet another feature of the present invention, method for improved internet searching, further comprises the steps of: prior to the step of executing a search, converting the selected search topic into a query string of requests "ANDed" together; storing the query strings into a queue; sending the queue to selected virtual search engines; translating the queries to the specific format of the selected search engines; querying each of the "n" search engines; determining whether the query has returned zero results; if query returns zero results, then, removing child queries; otherwise, parsing and storing the results in a database; determining whether there are more queries; if there are more queries, then; returning to the step of querying each of the "n" search engines; otherwise, waiting for each of the "n" search engines to complete their searching; retrieving stored results; and combining and ranking the results.

According to still another feature of the present invention, method for improved internet searching, further comprises the steps of: retrieving the results stored in the database, determining whether the URL is unique, if the URL is not unique, then updating the overall average, otherwise, adding the hit to the URL in the list, determining whether there are more hits, if there are more hits, then returning to the step of determining whether the URL is unique, otherwise, computing a rank using a ranking formula; sorting by rank number in descending order, and returning an ordered list.

According to still yet another feature of the present invention, method for improved internet searching, further comprises a ranking formula denoted by:

Rank=(Number of Search Engines that Returned a Document)*(Separation Coefficient)−(Average Rank From Each Search Engine)

These and may other objects, features and advantages of the present invention will be readily apparent to one skilled in the pertinent art from the following detailed description of a preferred embodiment of the invention and the related figures, in which like reference numerals designate the same elements.

BRIEF DESCRIPTION OF THE DRAWINGS

FIG. 5 depicts the ranking algorithm of the present invention.

DETAILED DESCRIPTION OF THE PREFERRED EMBODIMENT

Figure 1:
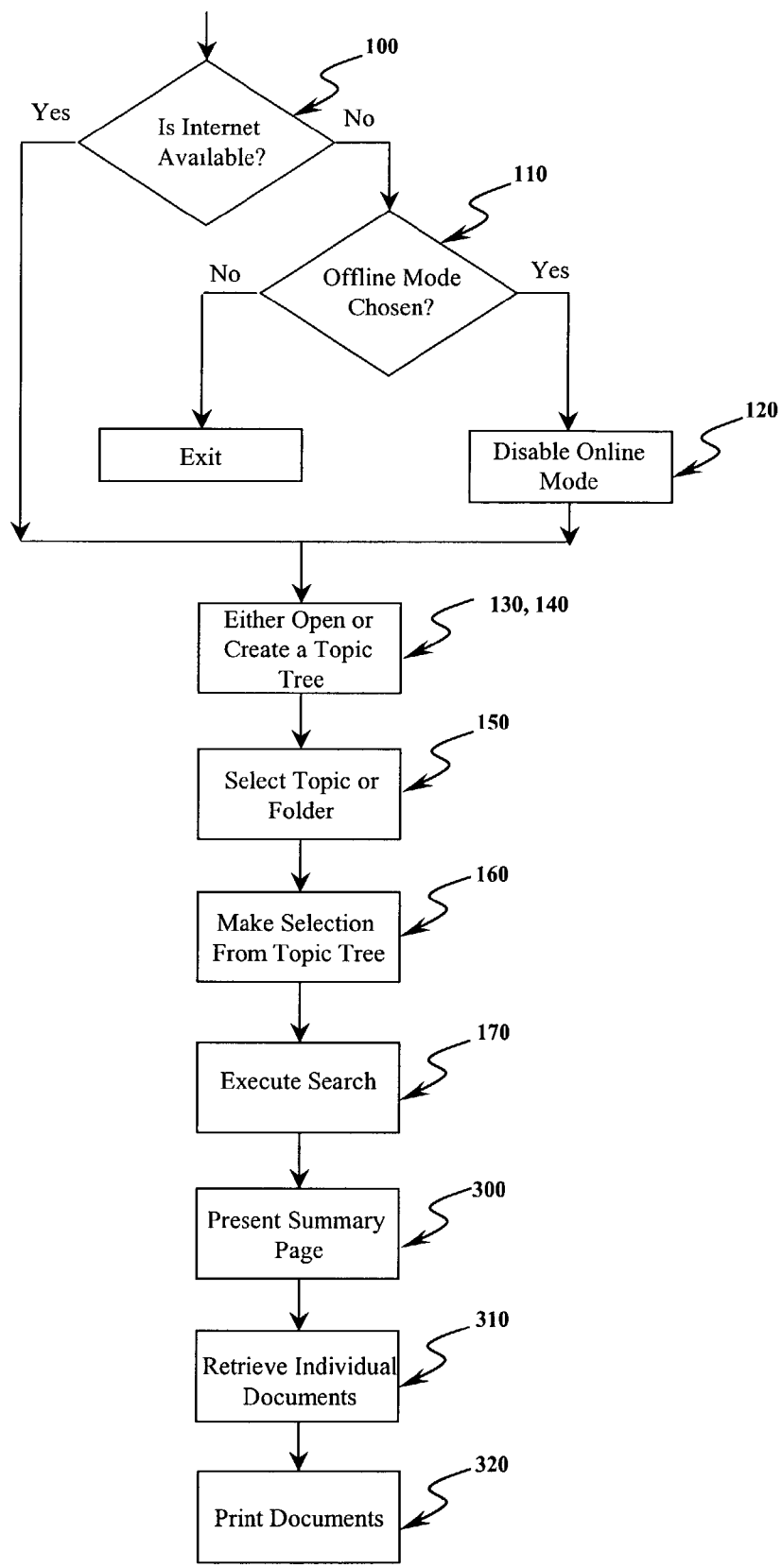
FIG. 1 depicts an overview of the present invention.

The present invention provides a method and apparatus for improved Internet searching. Referring to FIG. 1, the user is provided a set of tools that allow for the creation and modification of topic trees and storage for later use. To begin, the present invention checks 100 to see if the user's computer is either on and can access the Internet. If so, the process of the present invention proceeds normally. If no network connection to the Internet is found, the present invention will ask 110 if the user wishes to continue in an off-line mode. If the user answers "yes" (to the off-line mode), the invention will cause the main screen of the user's computer to display 120 that the on-line mode is disabled. All requests at this point will be performed against the database. At the user's request, the invention will perform no operations and exit if "no" is chosen.

A second capability, provided as a tool, is a utility that has the ability to test the existing sources. The utility performs a series of tests against each of the selected sources to determine if the present invention can still connect to the source and successfully parse the results file.

Still referring to FIG. 1 user may open 130 an existing topic tree (see FIG. 2) or create 140 a topic tree from new. The user then selects 150 whether to search a topic or a folder of topics from the tree. By selecting one node from the topic tree, 160 a single item, a collection of items or the entire tree to collect upon. The user then executes the search 170. At this point, the search and retrieval process occurs within the present invention (as depicted in FIGS. 3, 4, 5 and 6). The search engine within the present invention passes the user's request(s) in the form of query strings converted from topic tree inputs to each selected source (see 180, FIG. 3) and waits for all requests to complete. Results from the selected search engines are retrieved (see 280, FIG. 3) and then combined and ranked (see 290, FIG. 3). Following the execution of the search 170, a summary page is presented 300, individual documents are retrieved 310, and then the documents are printed 320.

Figure 2:
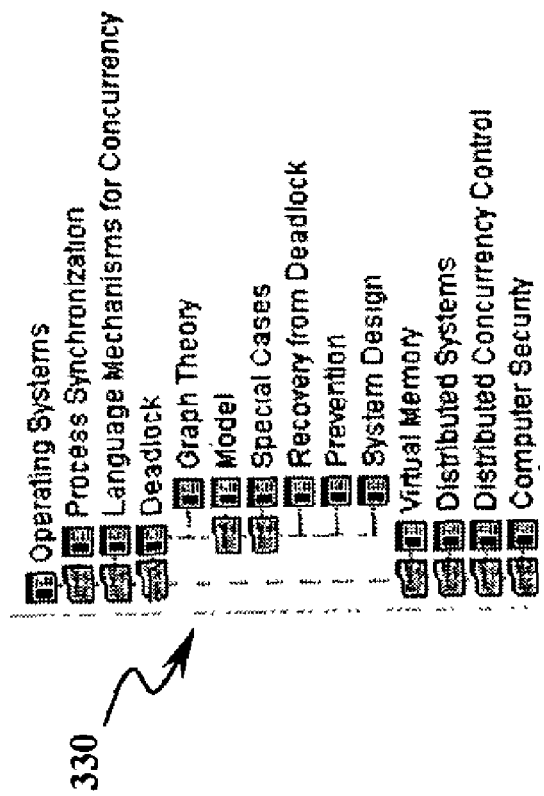
FIG. 2 depicts a topic tree of the present invention.

Referring to FIG. 2, unlike any other meta-search engine, the present invention uses the concept of topic trees 330 to assist the user in defining his problem. Topic trees allow the user to define a problem as a set of hierarchical terms starting with a broad term and continuing linking terms together to define the problem set using more detailed terms further down in the tree. FIG. 2 shows a topic tree 330 that was developed for an individual wishing to write a book or article on the topic of "Operating Systems".

Figure 3:
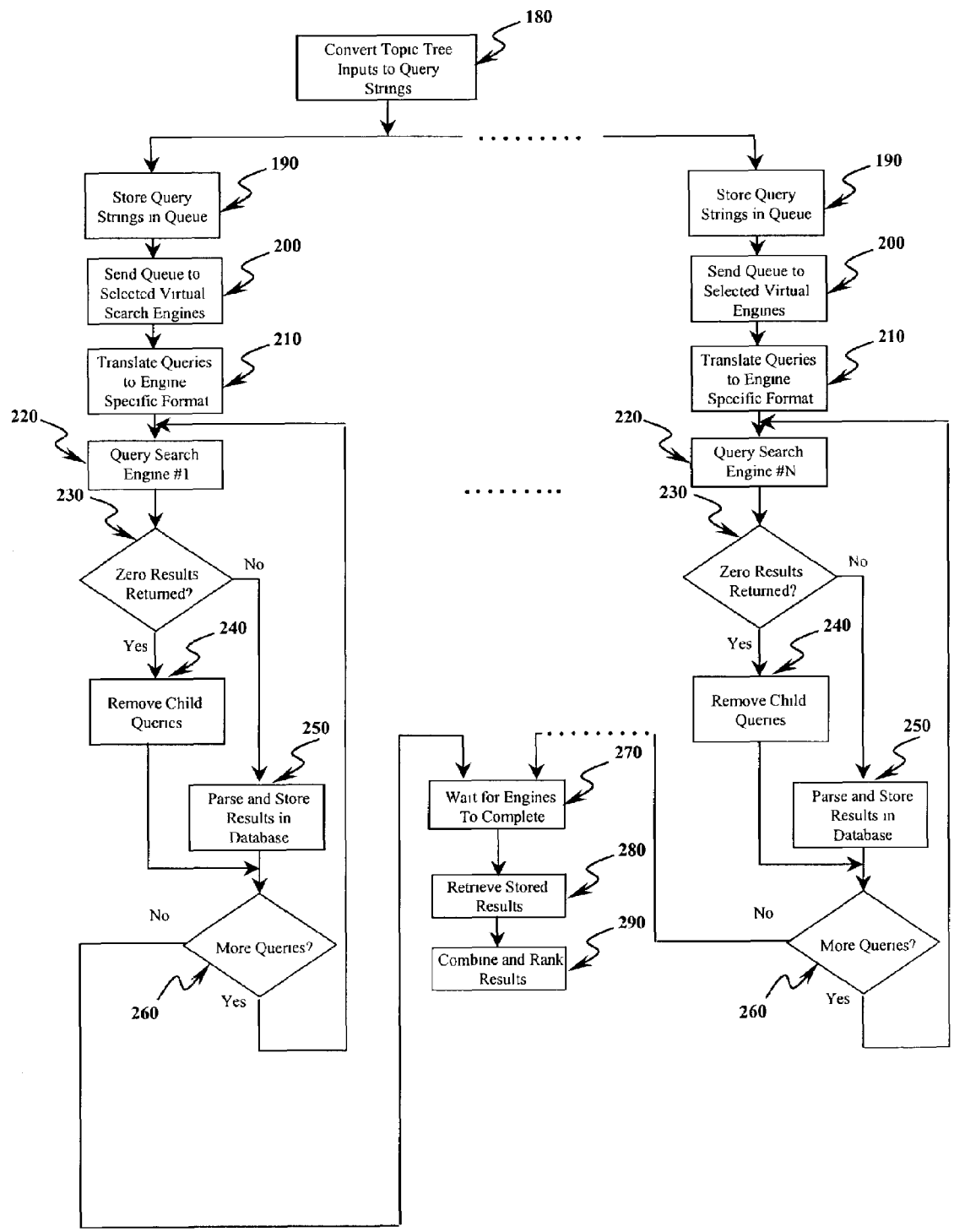
FIG. 3 depicts a detailed view of the query process of the present invention.

Referring to FIG. 3, the present invention takes the topic tree (see 330, FIG. 2), converts it 180 into a series of requests in the form of query strings converted from topic tree inputs to each selected source, stores 190 the request or query strings in a queue, and sends 200 the requests to the selected virtual search engines. Search engines are accessed through what are called "search adapters". Search adapters allow the present invention to connect up to various sources by translating queries 210 to engine-specific format. In other words, to speak the source's language, and return and normalize the results. It is not uncommon for a commercial vendor to change the web site's format and thus also not uncommon for tools, like the present invention and other meta-search engines, to break either when attempting to access the web site or parse the returned results. The present invention provides a unique capability within its interface (see 640, FIG. 4) to dynamically add and modify existing sources without any programming. The present invention then queries 220 each of "n" search engines.

The results of each search are compared each time to previous searches of the same request and new items are identified on the summary page. The present invention inspects the results of each query. If it is determined 230 that a specific source returns back zero results for the specified topic, then all subsequent children topics for that source also return zero results because of their logical "ANDing". Instead of sending these queries to the source, the present invention intervenes and removes the child queries 240 from the source's request queue.

If it is determined 230 that results are returned, the present invention parses the page and stores the results 250. If it is determined 260 that there are more queries, the present invention returns to the step of querying 220 each of "n" search engines. If it is determined that there are no more queries 260, the present invention waits 270 for all "n" search engines to complete their searches. Once all searches are completed, stored results are retrieved 280 and then combined and ranked 290.

A summary page is presented (see 300, FIG. 1). The summary page provides the user a quick synopsis of what is available from the various sources for each of the topics chosen. From this page the user can get results (see 560, FIG. 6) from an individual search engine, display a combined list rank by the present invention's own ranking algorithm, retrieve the individual documents (see 310, FIG. 1) or print out (see 320, FIG. 1) the results.

Figure 4:
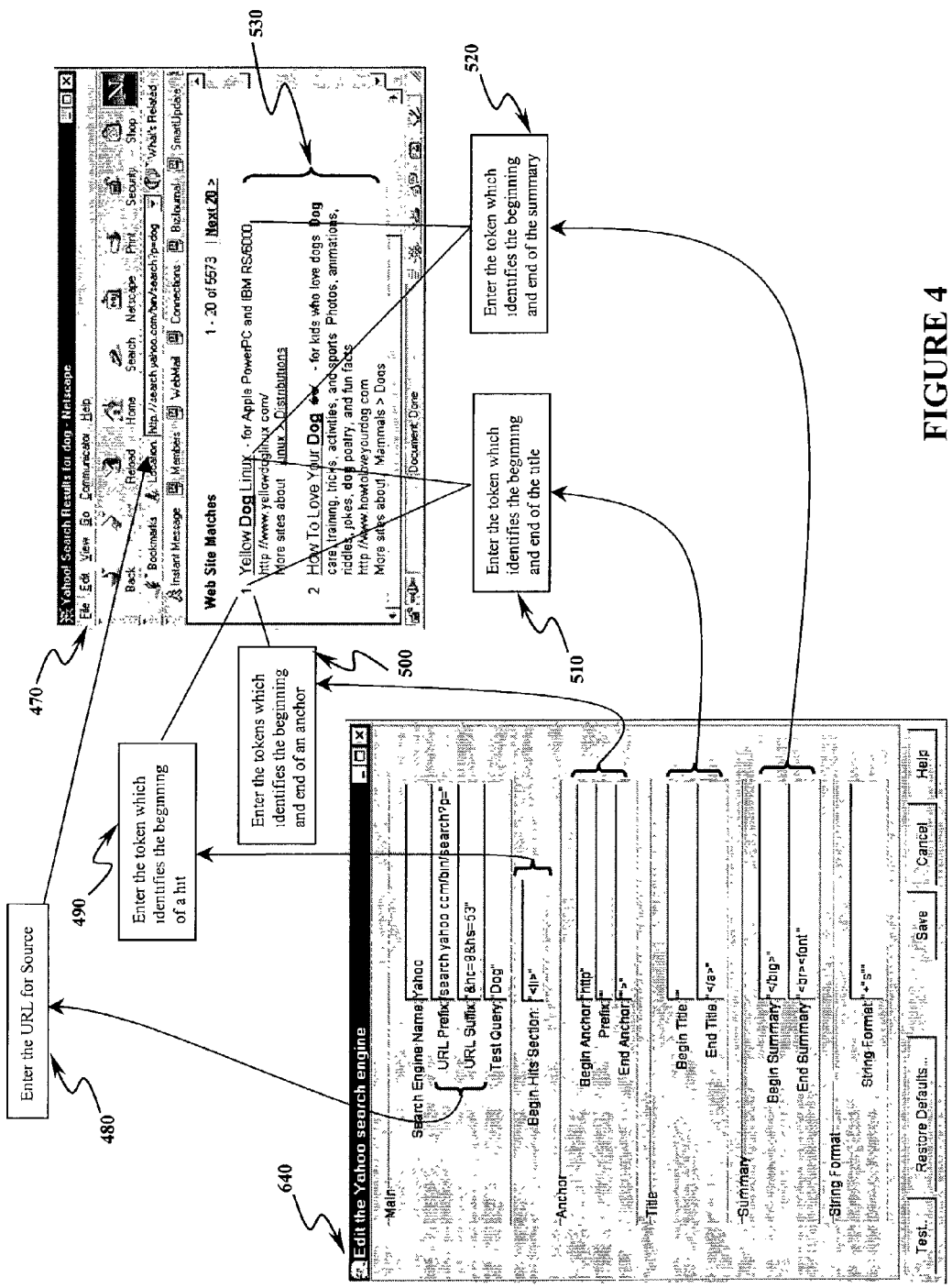
FIG. 4 depicts search results, an editor, and tokens used to parse the results in the present invention.

Referring to FIG. 4, the how and what of parsing has been separated in the present invention. A parser has been provided which takes a series of tokens to parse (see 250, FIG. 3) a file. These tokens are strings that describe the format for a search engine's web page 470. Each set of tokens is specific to the results page 530 that a source returns. The present invention is unique because the user can dynamically create, remove, and edit these files without making any software changes. Using the editor 640, a user can enter the URL for a source 480; enter the token which identifies the beginning of a hit 490; enter the tokens which identify the beginning and the end of an anchor 500; enter the tokens which identify the beginning and the end of a title 510; enter the tokens which identify the beginning and the end of the summary 520, and enter a regular expression for the query format.

Referring to FIG. 5, fundamental concept behind a meta-search engine such as in the present invention is the ranking algorithm 540 solution applied subsequent to searches performed by individual search engines. This reduces computing time and database assembly time when searching the Internet, allowing for faster querying and increased coverage. In the present invention, results of each of the individual search engine are queried and a list of the "best" web sites that will be most informative to the user is produced. The algorithm used in the present invention needed to not only take into account the number of search engines that a specific site was returned from, but also the average rank of the site—a distinct feature commercial meta-search engines universally lack. The algorithm development began by analyzing the top 20 results from each of the major search engines. It was discovered that the sites on the first page of returns from the engines were sufficient to feed the algorithm. The reason for this is that the further a user descends down the results list, the less relevant the returned results are.

Figure 6:
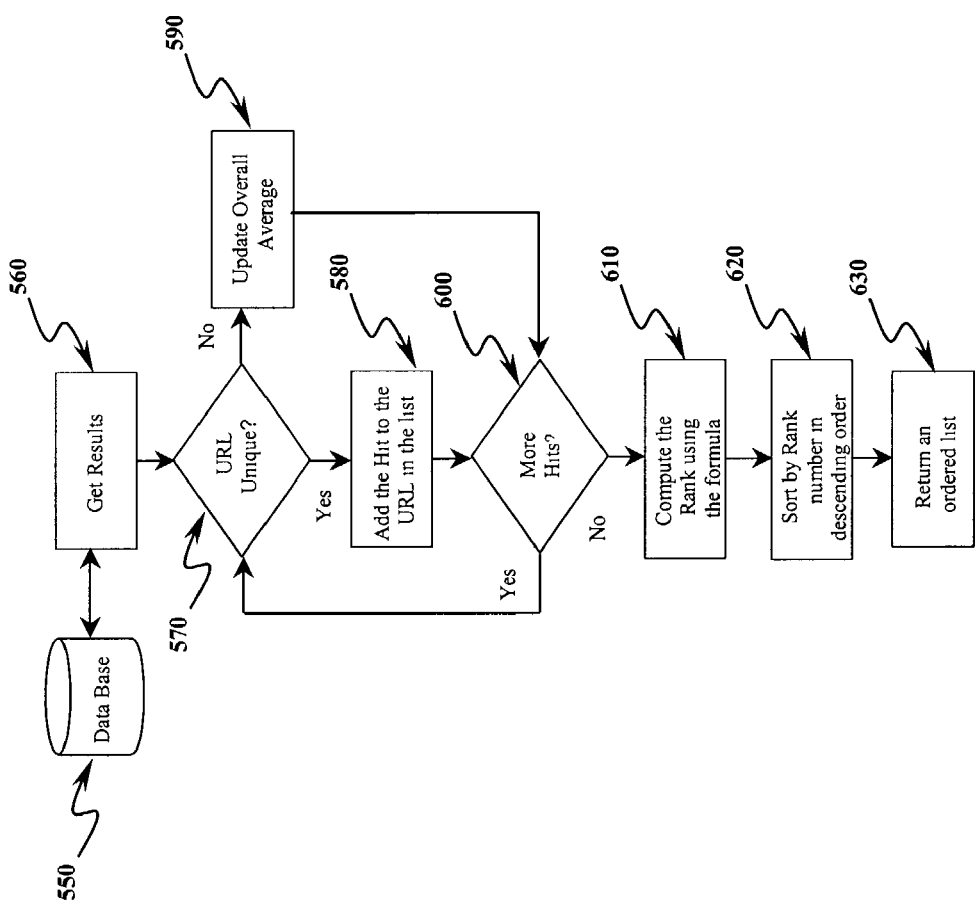
FIG. 6 depicts the ranking process of the present invention.

Referring to FIG. 6, the ranking algorithm process flow is shown. Database 550 results are retrieved 560. If it is determined 570 that the URL is unique, then the "hit" is added 580 to the URL in the list. Otherwise, the overall average is updated 590 and the process continues by determining 600 if there are more hits. When it is determined 600 that there are no further hits, the rank is computed 610 using the ranking algorithm (see 540, FIG. 5). Sites that returned results are then sorted 620 in descending order by rank number and an ordered list is returned 630.

The results of the formula are arbitrary; however, when taken in context with all of the other sites' results, a sort in descending order will produce a rank. This combination formula can be used with any number of composite search engines and any number of returns from those search engines.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. A software program comprising instructions, stored on a computer-readable media, wherein said instructions, when executed by a computer, perform the necessary steps for improved Internet meta-searching employing the execution of a plurality of search queries by a plurality of search engines, comprising:

determining whether the internet is available;
IF the internet is available, THEN,
    proceeding to said step of opening a topic tree;
OTHERWISE,
    determining if an offline mode has been chosen;
    IF an offline mode has been chosen, THEN,
        displaying an indication that online mode is disabled;
        proceeding to said step of opening a topic tree;
    OTHERWISE,
        exiting the program;
opening a topic tree or creating a new one if none exists;
a first step of selecting either a topic or a folder of topics from which to search, from said topic tree;
a second step of selecting a search topic;
converting said selected search topic into a query string of requests ANDed together;
storing said query strings into a queue;
sending said queue to selected virtual meta-search engines;
translating said queries to a format specific to that of said selected meta-search engines;
executing a meta-search by said plurality of search engines;
querying each of "n" said plurality of meta-search engines;
determining whether said query has returned zero results;
    IF query returns zero results, THEN,
        removing child queries;

OTHERWISE,
    parsing and storing said results in a database;
determining whether there are more queries;
    IF there are more queries, THEN;
        returning to said step of querying each of "n" said plurality of search engines;
    OTHERWISE,
        waiting for each of "n" said plurality of search engines to complete their searching;
        retrieving stored results; and
        combining and ranking said results;
presenting a summary page;
retrieving individual documents; and
printing said documents.

2. Method of claim 1, further comprising the steps of:
integrating XML schema;
reading said XML schema; and
displaying pertinent information in a topic tree.

3. Method of claim 2, wherein said step of displaying further comprises the steps of:
generating new schema; and
editing said schema.

4. Method of claim 2, further comprising the step of creating topic trees using XML schema.

5. Method of claim 4, wherein said step of creating further comprises the steps of:
importing files from which said topic trees will be created;
converting said imported files; and
exporting said created topic trees.

6. Method of claim 1, wherein said step of parsing further comprise the steps of:
utilizing tokens to enable said step of parsing, wherein said tokens comprise strings that describe the format for a search engine's web page and are specific to the results page that a source returns.

7. Method of claim 6, further comprising:
entering a token which identifies a beginning of a hit;
entering tokens which identify a beginning and an end of an anchor;
entering tokens which identify a beginning and an end of a title;
entering tokens which identify a beginning and an end of a summary; and
entering a regular expression to describe query format.

8. Method of claim 1, wherein said step of ranking results of said search further comprises the steps of:
retrieving said results stored in said database;
determining whether any URL associated with said retrieved results is unique;
    IF said any URL is NOT unique; THEN:
        updating overall avenge
    OTHERWISE, adding a hit to said any URL in said list
    determining whether there are more hits;
    IF there are more hits, THEN:
        returning to said step of determining whether said any URL is unique
    OTHERWISE,
        computing a rank using a ranking formula;
        sorting by rank number in descending order; and
        returning an ordered list.

9. Method claim 8, wherein said ranking formula comprises:

Rank=(Number of Search Engines that Returned a Document)*(Separation Coefficient)−(Average Rank From Each Search Engine).

10. A computer apparatus comprising a computer and a software program, said software program further comprising instructions stored on a computer-readable media, wherein said instructions, when executed by said computer, provide means for improved Internet meta-searching employing a plurality of search engines executing a plurality of search queries, wherein said means comprise:
means for determining whether the internet is available;
IF the internet is available, THEN,
    means for proceeding to said step of opening a topic tree;
OTHERWISE,
    means for determining if an offline mode has been chosen;
    IF an offline mode has been chosen, THEN,
        means for displaying an indication that online mode is disabled;
        means for proceeding to said step of opening a topic tree.
    OTHERWISE,
        means for exiting the program;
means for opening a topic tree or creating a new one if none exists;
a first means for selecting either a topic or a folder of topics from which to search, from said topic tree;
a second means for selecting a search topic;
means for converting said selected search topic into a query string of requests ANDed together;
means for storing said query strings into a queue;
means for sending said queue to selected virtual search engines;
means for translating said queries to a format specific to that of said selected search engines;
means for executing a meta-search by said plurality of meta-search engines;
means for querying each of "n" said search engines;
means for determining whether said query has returned zero results;
    IF query returns zero results, THEN,
        means for removing child queries;
    OTHERWISE,
        means for parsing and storing said results in a database;
    means for determining whether there are more queries;
        IF there are more queries, THEN;
            means for returning to said step of opening each of "n" said search engines;
        OTHERWISE,
            means for waiting for each of "n" search engines to complete their searching;
            means for retrieving stored results; and
            means for combining and ranking said results
    means for presenting a summary page;
    means for retrieving individual documents; and
    means for printing said documents.

11. Apparatus as in claim 10, further comprising:
means for integrating XML schema;
means for reading said XML schema; and
means for displaying pertinent information in a topic tree.

12. Apparatus as in claim 11, wherein said means for displaying further comprises:
means for generating new schema; and
means for editing said schema.

13. Apparatus as in claim 11, further comprising means for creating topic trees using XML schema.

14. Apparatus as in claim 13, wherein said means for creating further comprises:
means for importing files from which said topic trees will be created;
means for converting said imported files; and
means for exporting said created topic trees.

15. Apparatus as in claim 10, wherein said means for parsing further comprises:
means for utilizing tokens to enable said means for parsing, wherein said tokens comprise airings that describe the format for a search engine's web page and are specific to the results page that a source returns.

16. Apparatus as in claim 15, further comprising:
means for entering a token which identifies a beginning of a hit;
means for entering tokens which identify a beginning and an end of an anchor;
means for entering tokens which identify a beginning and an end of a title;
means for entering tokens which identify a beginning and an end of a summary; and
means for entering a regular expression to describe query format.

17. Apparatus as in claim 10, wherein said means for ranking results of said search further comprises:
means for retrieving database results;
means for determining whether any URL associated with said retrieved results is unique;
IF said any URL is NOT unique; THEN:
means for updating overall average
OTHERWISE, means for adding a hit to said any URL in said list
means for determining whether there are more hits;
IF there are more hits, THEN:
means for returning to said step of determining whether said any URL is unique
OTHERWISE,
means for computing a rank using a ranking formula;
means for sorting by rank number in descending order; and
means for returning an ordered list.

18. Apparatus as in claim 17, wherein said ranking formula comprises:

Rank=(Number of Search Engines that Returned a Document)*(Separation Coefficient)−(Average Rank From Each Search Engine).

* * * * *